(12) United States Patent
Boisson et al.

(10) Patent No.: US 12,073,579 B2
(45) Date of Patent: Aug. 27, 2024

(54) LOCAL LIGHT FIELD FLOW AS AN ALTERNATIVE TO PLANE-SWEEP VOLUMES

(71) Applicant: INTERDIGITAL CE PATENT HOLDINGS, SAS, Paris (FR)

(72) Inventors: Guillaume Boisson, Pleumeleuc (FR); Tomas Volker, Buenos Aires (AR); Bertrand Chupeau, Rennes (FR); Didier Doyen, Cesson-Sévigné (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 12 days.

(21) Appl. No.: 18/008,843

(22) PCT Filed: Jun. 7, 2021

(86) PCT No.: PCT/EP2021/065181
§ 371 (c)(1),
(2) Date: Dec. 7, 2022

(87) PCT Pub. No.: WO2021/249949
PCT Pub. Date: Dec. 16, 2021

(65) Prior Publication Data
US 2023/0215030 A1    Jul. 6, 2023

(30) Foreign Application Priority Data

Jun. 9, 2020   (EP) .................................. 20305618

(51) Int. Cl.
*G06T 7/557* (2017.01)
*G06T 7/80* (2017.01)
*H04N 23/957* (2023.01)

(52) U.S. Cl.
CPC ............... *G06T 7/557* (2017.01); *G06T 7/80* (2017.01); *H04N 23/957* (2023.01);
(Continued)

(58) Field of Classification Search
CPC ...................... G06T 7/557; G06T 7/80; G06T 2207/10024; G06T 2207/20021;
(Continued)

(56) References Cited

U.S. PATENT DOCUMENTS 8,111,320 B2 *   2/2012   Drazic ................... H04N 23/45
                                                  348/222.1
8,941,771 B2 *   1/2015   Iwane .................... H04N 23/55
                                                  348/340
(Continued)

OTHER PUBLICATIONS

Srinivasan et al., "Pushing the Boundaries of View Extrapolation with Multiplane Images", Institute of Electrical and Electronics Engineers (IEEE), 2019 IEEE/CVF Conference on Computer Vision and Pattern Recognition (CVPR), Long Beach, California, USA, Jun. 15, 2019, 10 pages.

(Continued)

*Primary Examiner* — Marly S Camargo
(74) *Attorney, Agent, or Firm* — CONDO ROCCIA KOPTIW LLP

(57) ABSTRACT

An apparatus and a method are provided for image processing. In one embodiment, the method comprises accessing a plurality of images captured by at least a reference camera, wherein the images represent a plurality of views corresponding to said same scene. A plurality of plane sweep volume (PSV) slices are then generated from said images and computing for each slice a flow map from at least the reference camera calibration parameter and this flow map a previous slice of the plane sweep volume is generated.

16 Claims, 10 Drawing Sheets

(52) U.S. Cl.
 CPC .............. *G06T 2207/10024* (2013.01); *G06T 2207/20021* (2013.01); *G06T 2207/20084* (2013.01); *G06T 2207/30244* (2013.01)

(58) Field of Classification Search
 CPC ........... G06T 2207/20084; G06T 2207/30244; G06T 2207/10052; H04N 23/957
 See application file for complete search history.

(56) References Cited

U.S. PATENT DOCUMENTS

| | | | |
|---|---|---|---|
| 11,930,184 B2* | 3/2024 | Urban | H04N 19/82 |
| 2011/0096832 A1* | 4/2011 | Zhang | H04N 13/261 |
| | | | 375/240 |
| 2014/0192154 A1* | 7/2014 | Jeong | H04N 13/161 |
| | | | 348/43 |
| 2016/0248987 A1* | 8/2016 | Zilly | H04N 23/741 |
| 2024/0098235 A1* | 3/2024 | Sabater | H04N 13/161 |

OTHER PUBLICATIONS

Flynn et al., "Deep Stereo: Learning to Predict New Views From the World's Imagery", Institute of Electrical and Electronics Engineers (IEEE), 2016 IEEE Conference on Computer Vision and Pattern Recognition (CVPR), Las Vegas, Nevada, Dec. 12, 2016, 10 pages.

* cited by examiner

Table 1 - Notations

| | |
|---|---|
| (u, v) | Pixel coordinates |
| z | Depth Value in the Coordinate System of the Reference Camera |
| c | Camera Index |
| $I_c$ | Image from Camera #$c$ |
| $K \in R^{3 \times 3}$ | Intrinsic Matrix |
| $P = (R \quad T) \in R^{3 \times 4}$ | Pose Matrix |
| $Q = (R^t \quad -R^t \cdot T) \in R^{3 \times 4}$ | Extrinsic Matrix |
| $d \in R^2$ | Pixel Displacement, or "Flow" |

Figure 10

LOCAL LIGHT FIELD FLOW AS AN ALTERNATIVE TO PLANE-SWEEP VOLUMES

CROSS REFERENCE TO RELATED APPLICATIONS

This application is a U.S. National Stage Application under 35 U.S.C. 371 of International Patent Application No. PCT/EP2021/065181, filed Jun. 7, 2021, which is incorporated herein by reference in its entirety.

This application claims the benefit of European Application No. 20305618.9, filed Jun. 9, 2020.

TECHNICAL FIELD

The present disclosure generally relates to light field transmission and processing, including depth estimation and view synthesis, and more specifically to techniques and systems using neural network.

BACKGROUND

Many devices and systems allow a scene to be captured by generating image and/or video data of the scene. For example, a regular camera can be used to capture images of a scene for different purposes. One such use is to provide the 3D reconstruction of the scene geometry. Another is the rendering of virtual views of the scene.

Light field and plenoptic cameras provide more information than regular cameras. This is because the camera enables the acquisition of light field data and captures the light field emanating from a scene. That is the intensity of the light in the scene. One type of light field camera uses an array of micro-lenses placed in front of an otherwise conventional image sensor to sense intensity, color, and directional information. This allows several pictures to emerge from a single scene that provides more information than a regular camera.

In recent years cameras, and especially light field cameras have been used in the growing field of deep or neural networks. A deep or neural network (DNN) is an artificial neural network (ANN) with multiple layers between the input and output layers. The DNN finds the correct mathematical manipulation to turn the input into the output, whether it be a linear relationship or a non-linear relationship. These Deep-learning networks perform automatic feature extraction without human intervention, unlike most traditional machine-learning algorithms. In some cases, neural networks can be used to perform depth estimation and view synthesis, among other tasks. Given large amounts of data maintained by neural network based systems, such systems can generate high quality 3D reconstructions and view synthesis results. While neural networks (e.g., deep learning networks) have proven to be very versatile and accurate in a variety of tasks, such networks require high memory bandwidth and high computation cost.

Regardless of its purpose (view synthesis, depth estimation, etc.), light field processing requires the underlying ray geometry to be known. Acquisition devices must be calibrated but it is inconvenient to feed algorithms directly with calibration parameter sets. One issue is in the diversity of the existing devices and required calibration models (plenoptic cameras vs. camera rigs, distortion polynomials, etc.), that induces heterogeneous—and potentially computationally complex—processing. A common way to restore computational uniformity in the algorithms, especially when dealing with Convolutional Neural Networks (CNNs), consists in turning beforehand light field images into Plane-Sweep Volumes (PSVs). However, plane-sweep volumes are redundant and induce a significant memory footprint. Consequently, improved techniques for transmission and processing of images especially those provided by neural or deep networks are needed.

SUMMARY

Additional features and advantages are realized through similar techniques and other embodiments and aspects are described in detail herein and are considered a part of the claimed invention. For a better understanding of the invention with advantages and features, refer to the description and to the drawings.

An apparatus and a method are provided for image processing. In one embodiment, the method comprises accessing a plurality of images captured by at least a reference camera, wherein the images represent a plurality of views corresponding to said same scene. A plurality of plane sweep volume (PSV) slices are then generated from said images and computing for each slice a flow map from at least the reference camera calibration parameter and this flow map a previous slice of the plane sweep volume is generated.

In another embodiment, a method and apparatus is provided wherein the apparatus has a processor configured to obtain a first plane sweep volume (PSV) slice and its associated flow map and for determining camera calibration parameters associated with the first PSV and generating at least a previous or next PSV slice based on said first PSV slice and said camera parameters.

BRIEF DESCRIPTION OF THE DRAWINGS

The teachings of the present disclosure can be readily understood by considering the following detailed description in conjunction with the accompanying drawings, in which:

FIG. 10 is an illustration of an exemplary table of notations.

It should be understood that the drawings are for purposes of illustrating the concepts of the invention and are not necessarily the only possible configuration for illustrating the invention. To facilitate understanding, identical refer-

DETAILED DESCRIPTION OF PREFERRED EMBODIMENTS

Figure 1:
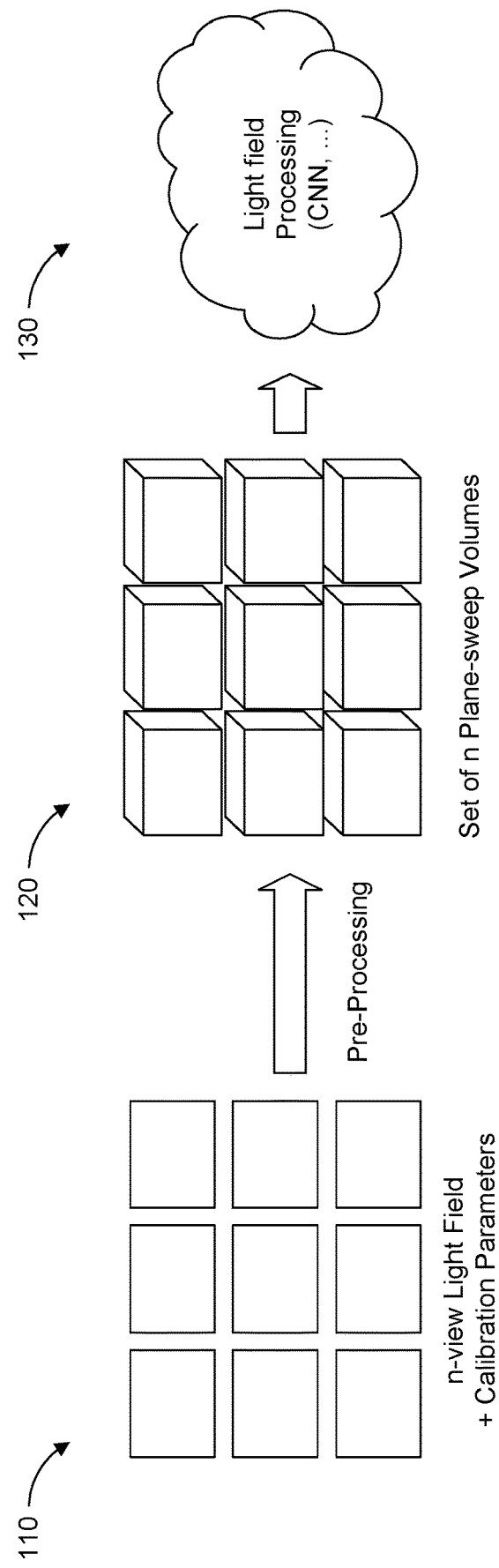
FIG. 1 is a block diagram of a Light field pre-processing block that is being processed into a Plane-Sweep Volume(s) PSV slice as in accordance with one embodiment.

FIG. 1 is an example of a Light field array. In FIG. 1, numerals referenced collectively as 110 provide a light field array of n-views which also includes calibration parameters. The array 110 is then set into n plane-sweep volumes as shown at 120. Indeed the light field samples coming from different views/sub-aperture images are aligned onto the same 2D Coordinate System in plane-sweep volumes as shown at 120. This resampling simplifies drastically subsequent processing; from that point on there is no need to take calibration parameters into account. Note however that this simplification does not come for free: plane-sweep volumes exhibit more redundancy than the original light fields they derive from. This is done pre-processing but once this step is performed, the data can then be ready for processing as shown at 130. This is one way to restore computational uniformity in the algorithms, especially when dealing with Convolutional Neural Networks (CNNs), consists in turning beforehand light field images into Plane-Sweep Volumes (PSVs).

Figure 2:
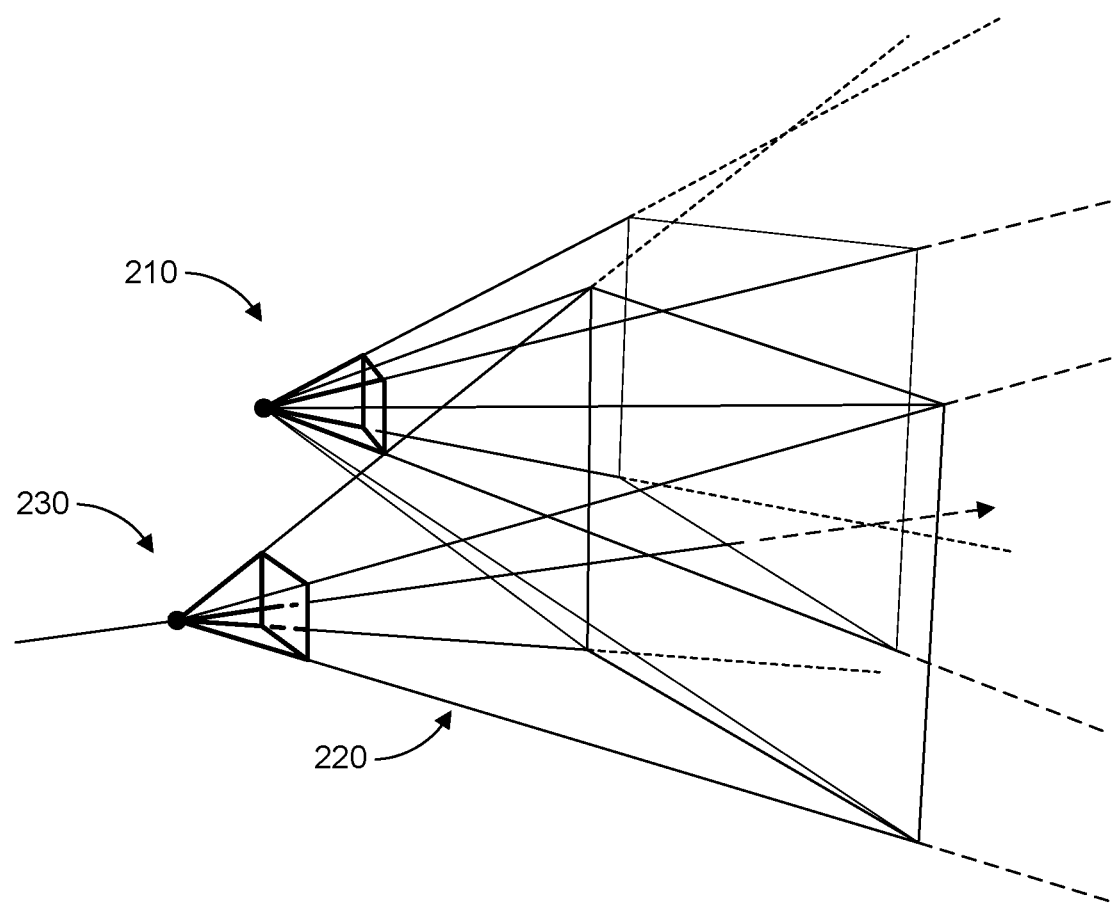
FIG. 2 is an illustration of an input image warped onto another camera assuming a depth in its Coordinate System in accordance with one embodiment.

FIG. 2 provides an example of warping an image onto another camera or camera obtained data. Resampling an input image into a plane sweep volume consists in warping that image onto a reference camera through successive planes at fixed depths in the Coordinate System of that reference camera (see FIG. 2). The depth values are usually uniformly sampled in $1/z$ in a $[z_{min}:z_{max}]$ range.

Referring back to FIG. 2, the input image 210 is warped onto another camera 220 assuming a depth of its Coordinate System 230. As depicted, some part of the resulting PSV slices may remain unknown, if no pixel from the input image maps on it. That's why plane-sweep volumes usually present 4 channels: namely RGBM, where RGB stand for the Red, Green and Blue colors, and M denotes a binary occupancy mask (valid/unknown). In this sense, plane-sweep volumes are therefore usually referred to as 4-dimensional tensors: [H, W, D, 4], where W and H denote reference camera's width and height, in pixels, and D denotes the number of slices in the volume (i.e. the number of fixed-depth planes considered).

FIG. 10 provides a table of notations that can be helpful in discussing the math and geometrical concepts as discussed in conjunction with FIGS. 1 and 2.

In many light field applications, to understand the parameters involved the following discussion can provide aid in understanding.

In this example a vector is considered as defined by $$\begin{pmatrix} x \\ y \\ z \end{pmatrix} \in \mathbb{R}^3, z \neq 0.$$

The vector's perspective projection is written as follows:

$$\begin{pmatrix} s \\ t \\ 1 \end{pmatrix} \cong \begin{pmatrix} x \\ y \\ z \end{pmatrix} \Leftrightarrow \begin{cases} s = x/z \\ t = y/z \end{cases}$$

There is a camera, having K as its intrinsic matrix:

$$K = \begin{pmatrix} f & \gamma & c_u \\ 0 & \alpha f & c_v \\ 0 & 0 & 1 \end{pmatrix} \in \mathbb{R}^{3 \times 3}$$

Where:
 f denotes the pinhole-sensor distance (usually misnamed as "focal length"), expressed in pixels;

$$\begin{pmatrix} c_u \\ c_v \end{pmatrix}$$

denotes the pixel coordinates of the pinhole projection onto the sensor ("principal point");
α denotes pixels' aspect ratio;
γ: skew coefficient, in pixels.

Let P be the pose matrix of the camera. It pictures the position and the orientation of the camera in the reference ("World") coordinate system:

$$P = (R T) \in \mathbb{R}^{3 \times 4}$$

Where R is a rotation matrix:

$$R \in \mathbb{R}^{3 \times 3}: \begin{cases} R^{-1} = R^t \\ \det(R) = 1 \end{cases}$$

And T is a translation vector:

$$T \in \mathbb{R}^3$$

The extrinsic matrix of the camera is defined as:

$$Q = (R^t - R^t \cdot T) \in \mathbb{R}^{3 \times 4}$$

Last let W: $\mathbb{R}^2 \to \mathbb{R}^2$ denote the warping operator that models the geometric distortion of the camera.

From a coordinate system (CS), calculations can be obtained for another. Let us consider an example with a 3D point. Let $X_{world}$ and $X_{cam}$ be its coordinates respectively in the World CS and in the CS of the camera. Then:

$$X_{cam} = Q \cdot \begin{pmatrix} X_{world} \\ 1 \end{pmatrix} \text{ and } X_{world} = P \cdot \begin{pmatrix} X_{cam} \\ 1 \end{pmatrix}$$

The image projection with distortion for this coordinate system to pixels can be then defined as:

$$\begin{pmatrix} u \\ v \\ 1 \end{pmatrix} = K \cdot \left( W \begin{pmatrix} s \\ t \end{pmatrix} \right) \text{ where } \begin{pmatrix} s \\ t \\ 1 \end{pmatrix} \cong Q \cdot \begin{pmatrix} x_w \\ y_w \\ z_w \\ 1 \end{pmatrix}$$

Without any distortion, this will become $$\begin{pmatrix} u \\ v \\ 1 \end{pmatrix} \cong K \cdot Q \cdot \begin{pmatrix} x_w \\ y_w \\ z_w \\ 1 \end{pmatrix}$$

Therefore, the 3D reconstruction from pixel to the coordinate system will become from a pixel $$\begin{pmatrix} u \\ v \end{pmatrix}$$

to 3D space, assuming the depth z in the CS of the camera:
with distortion $$\begin{pmatrix} x_w \\ y_w \\ z_w \end{pmatrix} = P \cdot \left( z \cdot \begin{pmatrix} W^{-1} \begin{pmatrix} s \\ t \end{pmatrix} \\ 1 \\ 1 \end{pmatrix} \right) \text{ where } \begin{pmatrix} s \\ t \\ 1 \end{pmatrix} = K^{-1} \cdot \begin{pmatrix} u \\ v \\ 1 \end{pmatrix}$$

without distortion $$\begin{pmatrix} x_w \\ y_w \\ z_w \end{pmatrix} = P \cdot \left( z \cdot K^{-1} \cdot \begin{pmatrix} u \\ v \\ 1 \end{pmatrix} \right)$$

Figure 4:
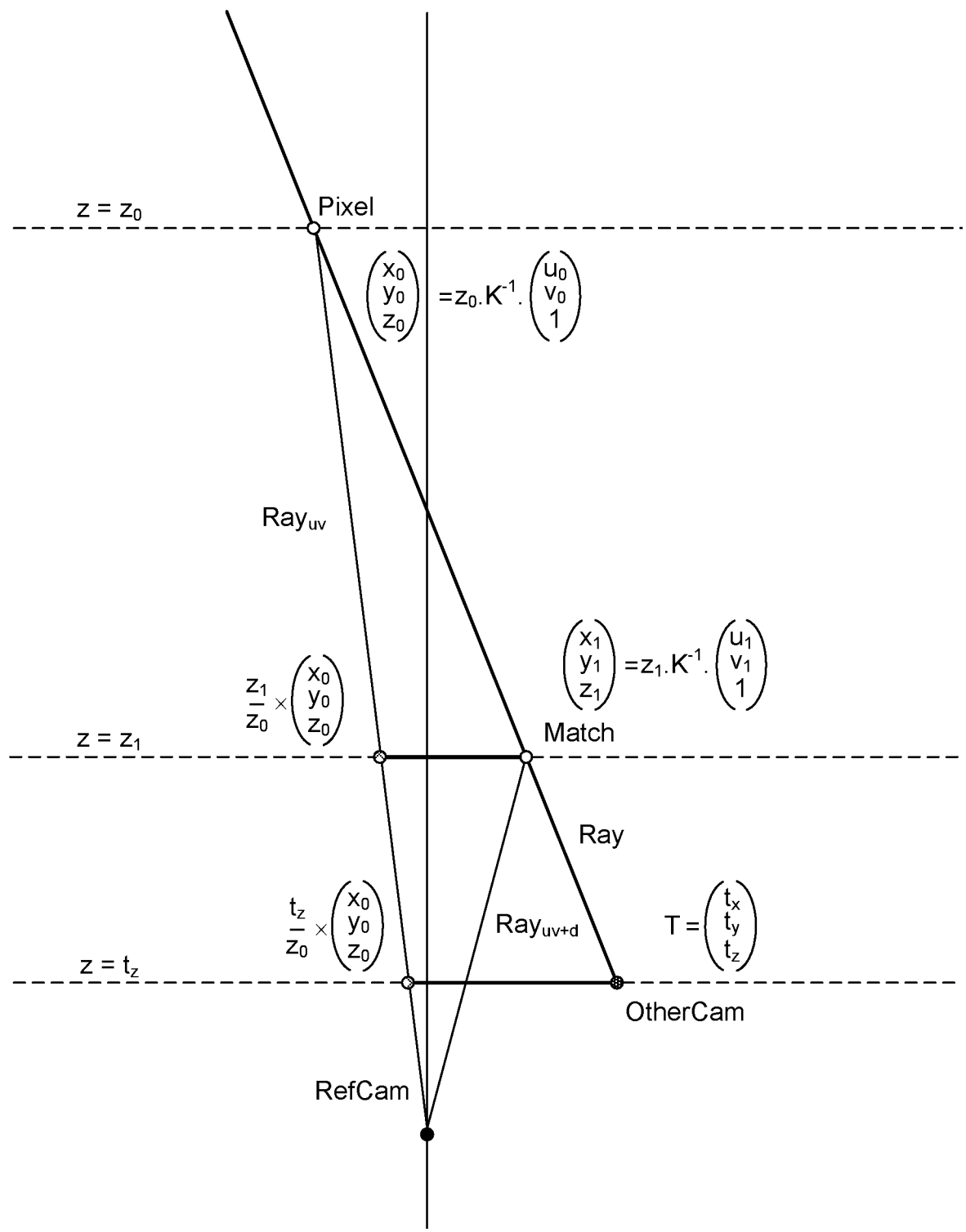
FIG. 4 is an illustration of an exemplary Schematic PSV geometry

Referring now to the information in FIG. 4, a reference camera can be used as way of example to aid the understanding of this concept to show the Schematic PSV geometry. In this example, let the reference camera be a plain pinhole camera determined by its intrinsic matrix K and its pose matrix P. Now consider an actual camera, also calibrated as a plain pinhole camera, whose intrinsic and extrinsic matrices are respectively denoted $K_c$ and $Q_c$. Say we want to turn an image $I_c$ recorded by the actual camera into a plane-sweep volume, and say we therefore consider D depth planes, located at depths $z_1, \ldots, z_D$ in the Coordinate System of the reference camera. The d-th slice of the plane-sweep volume ($1 \leq d \leq D$) is defined by the following resampling:

$$\forall (u,v) \in \mathbb{N}^2, S_c^d(u,v) = I_c(u',v')$$

where the interpolated pixel position $(u', v') \in \mathbb{R}^2$ is determined by:

$$\begin{pmatrix} u' \\ v' \\ 1 \end{pmatrix} \cong K_c \cdot Q_c \cdot \left( P \cdot \begin{pmatrix} z_d \cdot K^{-1} \cdot \begin{pmatrix} u \\ v \\ 1 \end{pmatrix} \\ 1 \end{pmatrix} \right)$$

Unfortunately, the main drawback of plane-sweep volumes lies in their size and there are issues with sufficient memory and the cost associated with it. Light field images are replicated along the z-axis, requiring a large chunk of memory to be allocated. This is critical because the size of a PSV increases cubically with the image resolution. Indeed, efficient CNNs usually require sub-pixel disparity (at most 1-pixel disparity) between two successive slices of the PSVs. If the resolution of the reference camera increases by a factor 2 in width and height, the number of slices must increase by 2 as well, and the total size of each PSV is multiplied by 8.

The order of magnitude is of some importance as well. For example, if for instance, there is a scene with objects lying from 1 m up to an infinite distance, like an outdoor selfie for instance. Consider a 5 cm baseline, which is quite small for immersive applications. Let's also stick to 1-pixel disparity between two PSV slices. Consider a 2K reference camera (2048×1088 resolution). With a standard field of view, this camera shall exhibit a focal length f≈2000 pixels. Which yields to:

$$D = \frac{b \cdot f}{z_{min}} \approx \frac{0.05 \times 2000}{1} = 100$$

Stored in a single-precision floating point format, one 100-slice PSV requires 100×1024×2048×4×4=3.5 Gigabytes (this means 7 GB for two views, 14 GB for four views, etc.). To circumvent this, light fields images and PSVs are usually tiled into smaller patches during training (e.g. 30×30 in [1]), yet the amount of data to maintain in memory for gradient back-propagation makes it intractable to scale up in number of views and in image resolution.

In one embodiment, an alternative would consist in processing each set of corresponding d-th slices (i.e. corresponding to the same depth) at a time, sequentially, from back to front or from front to back. Yet in most light field applications, addressing the third dimension is key to extracting the relevant features and performing the task required so this alternative have drawbacks.

Figure 3:
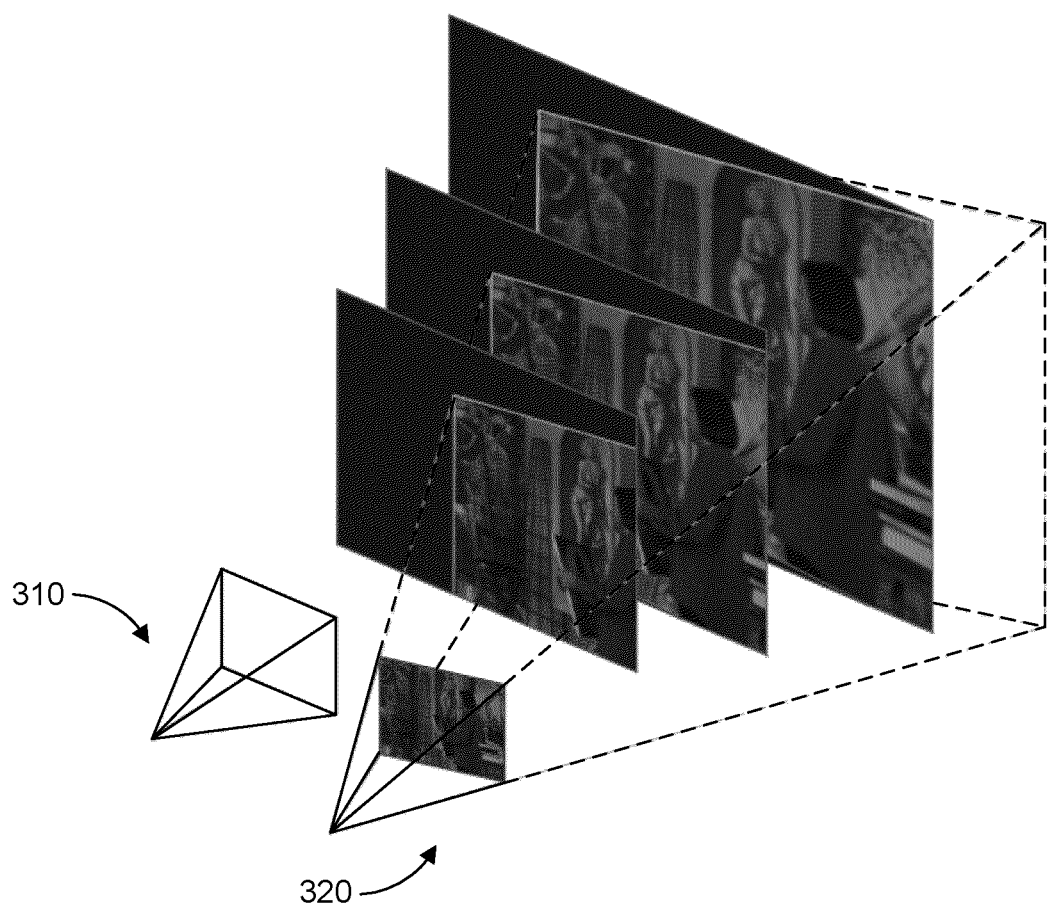
FIG. 3 is an illustration of components for a Reference camera and the other camera and the resulting PSV in accordance to one embodiment.

FIG. 3 provides one example according to one embodiment. In this embodiment, to each slice RGBM components a displacement component is appended. This component $$d = \begin{pmatrix} du \\ dv \end{pmatrix}$$

captures the flow from the current slice to the next one. Thus, the PSVs can be processed one slice at a time, decreasing significantly the memory requirement, which enables larger batch size, and/or higher spatio-angular resolution (pixels and views). Provided that the PSV is sampled uniformly in 1/z, the flow is naturally bi-directional; which means it applies both for previous and next slices. In other words, a displacement (flow) component for each slice of the PSV is considered. This can occur after the transmission of an encoded light field, if the decoder implements light field processing that require plane-sweep volumes.

Referring back to FIG. 3, this concept of successive slices of a PSV becoming redundant is shown). This redundancy can be captured by the flow from a slice to another. In FIG. 3, the reference camera 310 and the other camera 320 are shown and the resulting PSV is illustrated by the dotted lines.

The flow as shown in the example of FIG. 3, is obtained directly from the camera(s) parameters as follows:

Consider a reference camera calibrated as a plain pinhole camera and therefore determined by its intrinsic matrix K. In the sequel, the "reference" Coordinate System will refer to the Coordinate System of that reference camera. Now consider another camera of pose P=(R T) in the reference Coordinate System. Consider the plane-sweep volume of that second camera onto the reference camera. Now if T is denoted as $$T = \begin{pmatrix} t_x \\ t_y \\ t_z \end{pmatrix},$$

the displacement between a pixel $$\begin{pmatrix} u \\ v \end{pmatrix}$$

in the z-slice and its match $$\begin{pmatrix} u' \\ v' \end{pmatrix}$$

in another slice z' is determined by:

$$\frac{z'}{z'-z} \times \left[ \begin{pmatrix} u' \\ v' \\ 1 \end{pmatrix} - \begin{pmatrix} u \\ v \\ 1 \end{pmatrix} \right] = \frac{1}{t_z - z} \times \left[ K \cdot T - t_z \cdot \begin{pmatrix} u \\ v \\ 1 \end{pmatrix} \right]$$

Consider $z' = (1/z + \Delta)^{-1}$, i.e. $\Delta$ being the slice shift in $1/z$.
The displacement is given by:

$$d\left( \begin{pmatrix} u \\ v \end{pmatrix}, z, \Delta \right) = \frac{\Delta}{1 - t_z/z} \times \left[ K_{2 \times 3} \cdot T - t_z \cdot \begin{pmatrix} u \\ v \end{pmatrix} \right]$$

where $K_{2\times3}$ denotes the first two lines of K.
It can be observed that if $t_z = 0$, then the displacement does not depend on the pixel location anymore but only on the shift in $1/z$:

$$\forall \begin{pmatrix} u \\ v \end{pmatrix}, \forall z, d(\Delta) = \Delta \cdot K_{2 \times 3} \cdot T$$

Otherwise, if $t_z \neq 0$, then we can define $e \in \mathbb{R}^2$ the epipole of the second camera in the reference camera:

$$\begin{pmatrix} e \\ 1 \end{pmatrix} \cong K \cdot T,$$

and $$d\left( \begin{pmatrix} u \\ v \end{pmatrix}, z, \Delta \right) = \frac{\Delta}{1/t_z - 1/z} \times \left[ e - \begin{pmatrix} u \\ v \end{pmatrix} \right]$$

An example of this is provided in the schematic PSV geometry an the application of the above mentioned formulas.

The displacement of a pixel $$\begin{pmatrix} u \\ v \end{pmatrix}$$

in the z-slice corresponding to a shift $\Delta$ in $1/z$ is determined by:

$$d\left( \begin{pmatrix} u \\ v \end{pmatrix}, z, \Delta \right) = \frac{\Delta}{1 - t_z/z} \times \left[ K_{2\times3} \cdot T_c^{refCS} - t_z \cdot \begin{pmatrix} u \\ v \end{pmatrix} \right]$$

In this instance the displacement is odd in $\Delta$: changing the sign of the $1/z$ shift just changes the sign of the displacement:

$$d\left( \begin{pmatrix} u \\ v \end{pmatrix}, z, -\Delta \right) = -d\left( \begin{pmatrix} u \\ v \end{pmatrix}, z, \Delta \right)$$

The flow can therefore be used in a bidirectional manner, both for backward-warping previous slice and forward-warping the next one. In one embodiment, the light field flow can be computed at decoder side as long as calibration parameter sets are transmitted. Note that the only parameters required are the relative position of the other camera in the Coordinate System of the reference camera: $T_c^{refCS} = Q \cdot (T_c\ 1)^t$, and the intrinsic parameters of the reference camera. The z and $\Delta$ arguments are up to the user/decoder. In one embodiment, the flow can be fed along with the RGB(M) planes directly to an algorithm, e.g. a Convolutional Neural Network. It can also be used to recover next and previous slices, so that a RGB(M)-slice triplet is available for subsequent processing.

In one embodiment, the flow can be used to recover a whole plane-sweep volume from a single transmitted slice, provided that this only slice transmitted is chosen so that it is as filled as possible. In the case of parallel cameras this means the largest z value, whereas for convergent rigs, the depth of the convergence plane shall be preferred. Subsequently, the sequential reconstruction can be define as:
for each new slice:
first compute the flow map,
then backward-warp the previous RGB(M) slice to obtain the new one.

In an alternate embodiment, since the flow is spatially very smooth, it could also be encoded as a sub-pixel motion vector map if for some reason, its decoding would be preferable to its simple reconstruction math—or if for some other reason the calibration parameters could not be transported. In addition, provided that the decoder reconstructs a PSV that is uniformly sampled in $1/z$, the current flow map can be used to forward-warp itself and generate the next flow map.

Figure 5:
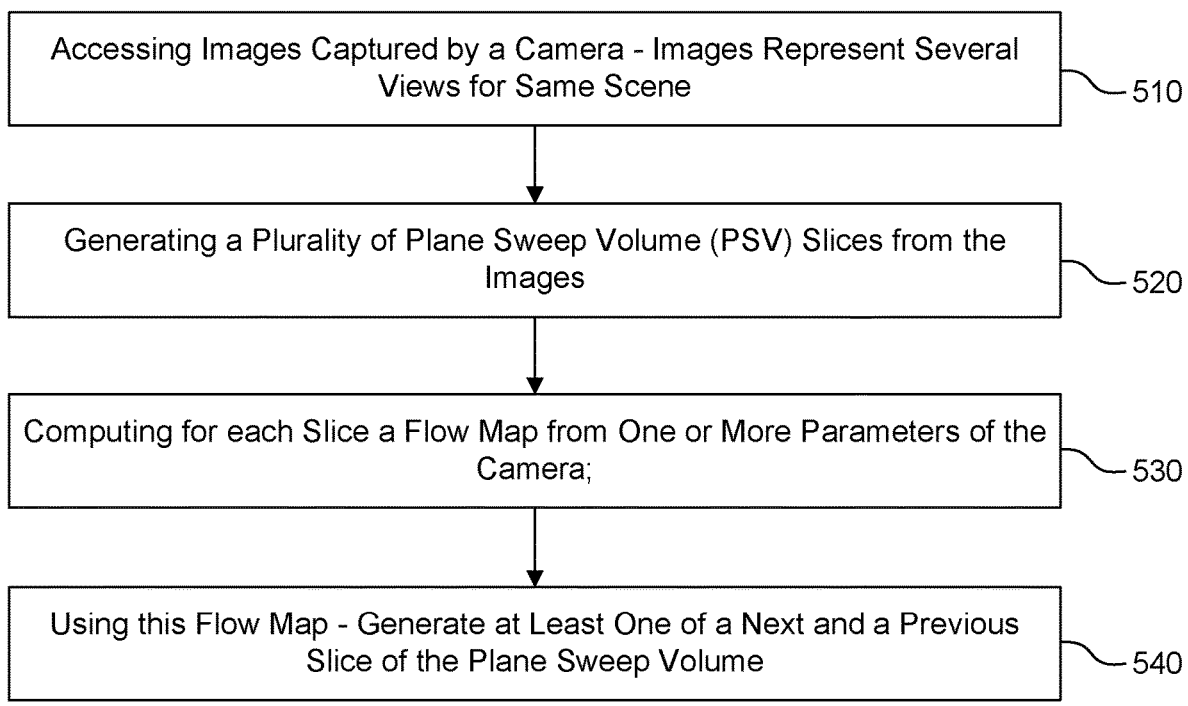
FIG. 5 is a flow chart illustration of one embodiment.

FIG. 5 is a flow chart illustration of one embodiment. FIG. 5 provides one method where as provided in step 510, accessing a plurality of images captured by a camera—the images represent a plurality of views corresponding to same scene. In step 520, a plurality of PSVs slices from the images are generated. In step 530, for each slice a flow map is computed from one or more parameters for the camera. In step 540, at least one of a next and a previous slice of the plane sweep volume is generated.

Figure 6:
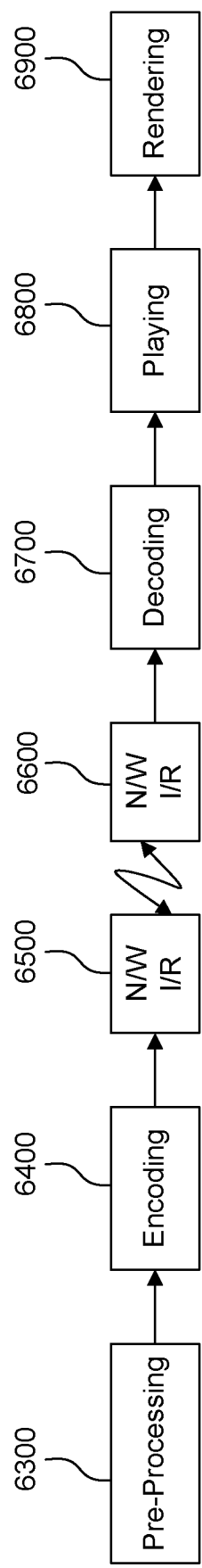
FIG. 6 is an illustration of a device that can be used in conjunction with implementation of one or more embodiments.

FIGS. 6-9 provide different devices that can be used in accommodating the functioning of one or more embodiments accordingly. For example, FIG. 6 schematically illustrates a general overview of an encoding and decoding system according to one or more embodiments. The system of FIG. 6 is configured to perform one or more functions and can have a pre-processing module 6300 to prepare a received content (including one more images or videos) for encoding by an encoding device 6400. The pre-processing module 6300 may perform multi-image acquisition, merging of the acquired multiple images in a common space and the like, acquiring of an omnidirectional video in a particular format and other functions to allow preparation of a format more suitable for encoding. Another implementation might combine the multiple images into a common space having a point cloud representation. Encoding device 6400 packages the content in a form suitable for transmission and/or storage for recovery by a compatible decoding device 6700. In general, though not strictly required, the encoding device 6400 provides a degree of compression, allowing the common space to be represented more efficiently (i.e., using less memory for storage and/or less bandwidth required for transmission). In the case of a 3D sphere mapped onto a 2D frame, the 2D frame is effectively an image that can be encoded by any of a number of image (or video) codecs. In the case of a common space having a point cloud representation, the encoding device 6400 may provide point cloud compression, which is well known, e.g., by octree decomposition. After being encoded, the data, is sent to a network interface 6500, which may be typically implemented in any network interface, for instance present in a gateway. The data can be then transmitted through a communication network 6500, such as internet but any other network may be foreseen. Then the data received via network interface 6600 may be implemented in a gateway, in a device. After reception, the data are sent to a decoding device 6700. Decoded data are then processed by the device 6800 that can be also in communication with sensors or users input data. The decoder 6700 and the device 6800 may be integrated in a single device (e.g., a smartphone, a game console, a STB, a tablet, a computer, etc.). In another embodiment, a rendering device 6900 may also be incorporated.

Figure 7:
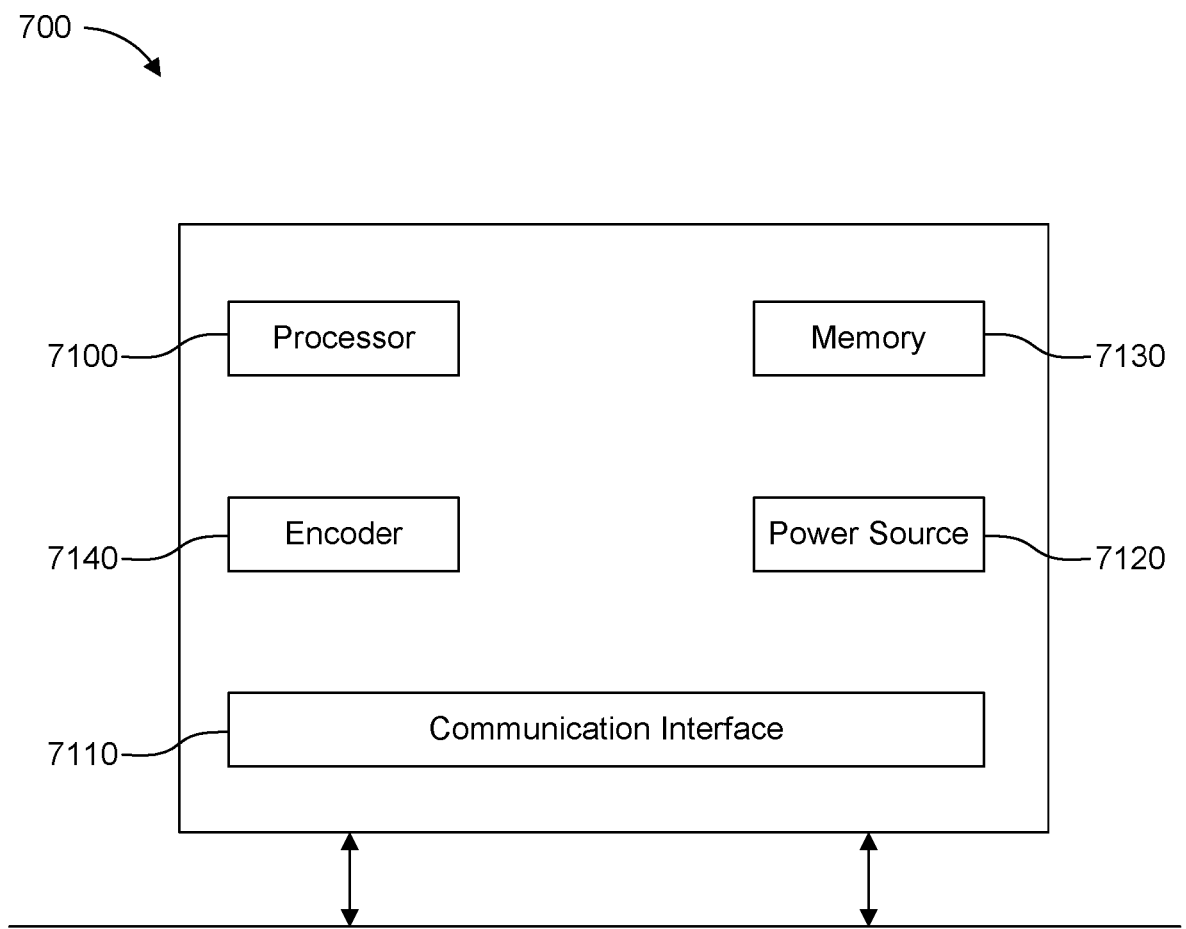
FIG. 7 and FIG. 8 are alternate embodiments of a device that can be used in conjunction with implementation of one or more embodiments showing an encoder and a decoder respectively.
Figure 8:
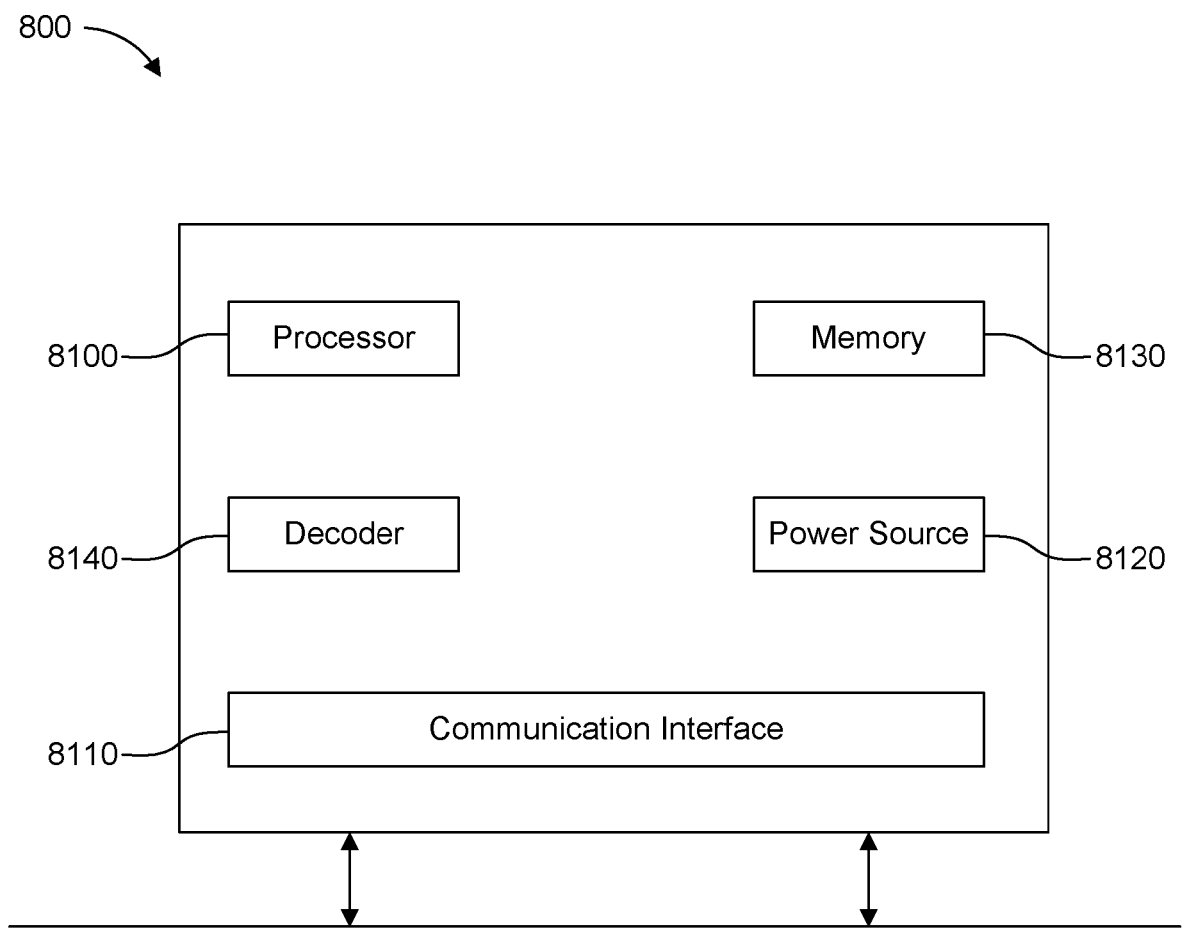

FIGS. 7 and 8 provide exemplary architecture of encoders and decoder structures including a transmitter/receiver 700/800 (as illustrated) configured to encode/decode a plenoptic image in a stream according to an exemplary and non-limiting embodiment.

In FIG. 7, the transmitter 700, which could comprise one or more processors 7100, for example, a CPU, a GPU and/or a DSP (English acronym of Digital Signal Processor), along with internal memory 7130 (e.g. RAM, ROM, and/or EPROM). The transmitter 700 also comprises one or more communication interface(s) 7110, each adapted to display output information and/or allow a user to enter commands and/or data (e.g. a keyboard, a mouse, a touchpad, a webcam); and a power source 7120 which may be external to the transmitter 700. The transmitter 700 may also comprise one or more network interface(s) (not shown). Encoder module 7140 represents a module that may be included in a device to perform the coding functions. Additionally, encoder module 7140 may be implemented as a separate element of the transmitter 700 or may be incorporated within processor(s) 7100 as a combination of hardware and software as known to those skilled in the art.

The plenoptic image may be obtained from a source. According to different embodiments, the source can be, but is not limited to: a local memory, e.g. a video memory, a RAM, a flash memory, a hard disk; a storage interface, e.g. an interface with a mass storage, a ROM, an optical disc or a magnetic support; a communication interface, e.g. a wireline interface (for example a bus interface, a wide area network interface, a local area network interface) or a wireless interface (such as a IEEE 802.11 interface or a Bluetooth interface); and an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 700 further comprises a computer program stored in the memory 7130. The computer program comprises instructions which, when executed by the transmitter 700, in particular by the processor 7100, enable the transmitter 700 to execute the method described with reference to FIGS. 1-5. According to an alternative embodiment, the computer program is stored externally to the transmitter 700 on a non-transitory digital data support, e.g. on an external storage medium such as a HDD, CD-ROM, DVD, a read-only and/or DVD drive and/or a DVD Read/Write drive, all known in the art. The transmitter 700 thus comprises a mechanism to read the computer program. Further, the transmitter 700 could access one or more Universal Serial Bus (USB)-type storage devices (e.g., "memory sticks.") through corresponding USB ports (not shown).

According to exemplary and non-limiting embodiments, the transmitter 100 can be, but is not limited to: a mobile device; a communication device; a game device; a tablet (or tablet computer); a laptop; a still image camera; a video camera; an encoding chip; a still image server; and a video server (e.g. a broadcast server, a video-on-demand server or a web server).

FIG. 8 represents an exemplary architecture of a receiver 800 configured to decode a plenoptic image from a stream according to an exemplary and non-limiting embodiment.

The receiver 800 comprises one or more processor(s) 8100, which could comprise, for example, a CPU, a GPU and/or a DSP (English acronym of Digital Signal Processor), along with internal memory 8130 (e.g. RAM, ROM and/or EPROM). The receiver 800 comprises one or more communication interface(s) 8110, each adapted to display output information and/or allow a user to enter commands and/or data (e.g. a keyboard, a mouse, a touchpad, a webcam); and a power source 8120 which may be external to the receiver 800. The receiver 800 may also comprise one or more network interface(s) (not shown). Decoder module 8240 represents a module that may be included in a device to perform the decoding functions. Additionally, decoder module 8140 may be implemented as a separate element of the receiver 800 or may be incorporated within processor(s) 8100 as a combination of hardware and software as known to those skilled in the art. The stream may be obtained from a source. According to different embodiments, the source can be, but not limited to: a local memory, e.g. a video memory, a RAM, a flash memory, a hard disk; a storage interface, e.g. an interface with a mass storage, a ROM, an optical disc or a magnetic support; a communication interface, e.g. a wireline interface (for example a bus interface, a wide area network interface, a local area network interface) or a wireless interface (such as a IEEE 802.11 interface or a Bluetooth interface); and an image capturing circuit (e.g. a sensor such as, for example, a CCD (or Charge-Coupled Device) or CMOS (or Complementary Metal-Oxide-Semiconductor)). According to different embodiments, the decoded plenoptic image may be sent to a destination, e.g. a display device. As an example, the decoded plenoptic image is stored in a remote or in a local memory, e.g. a video memory or a RAM, a hard disk. In a variant, the decoded plenoptic image is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the receiver 800 further comprises a computer program stored in the memory 8130. The computer program comprises instructions which, when executed by the receiver 800, in particular by the processor 8100, enable the receiver to execute the method described with reference to FIGS. 1-5 and 9. According to another embodiment, the computer program is stored externally to the receiver 800 on a non-transitory digital data support, e.g. on an external storage medium such as a HDD, CD-ROM, DVD, a read-only and/or DVD drive and/or a DVD Read/Write drive, all known in the art. The receiver 800 thus comprises a mechanism to read the computer program. Further, the receiver 800 could access one or more Universal Serial Bus (USB)-type storage devices (e.g., "memory sticks.") through corresponding USB ports (not shown).

Figure 9:
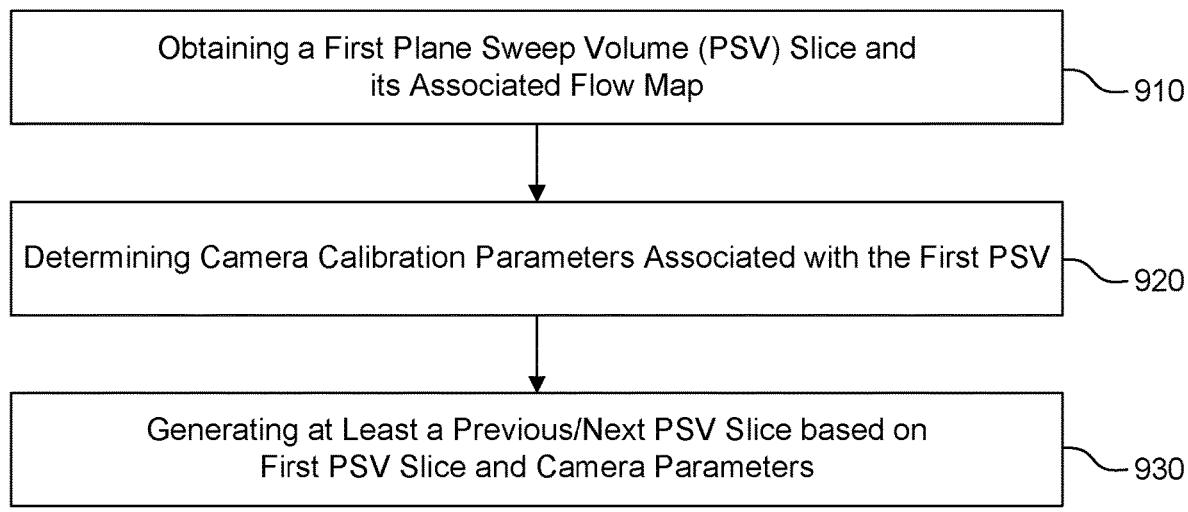
FIG. 9 is a flow chart illustration of another embodiment.

FIG. 9 provides another flow chart according to another method as provided by an alternate embodiment. In FIG. 9, in step 910 a first PSV slice and its associated flow map are generated. In step 920, the camera parameters are determined which are associated with the first PSV, In step 930, at least a previous or next PSV slice based on said first PSV slice and said camera parameters is generated.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. A method, comprising:
    accessing a plurality of images captured by one or more cameras, wherein said images represent a plurality of views corresponding to a same scene;
    generating a plurality of plane sweep volume (PSV) slices from said images and computing for each slice a displacement map from calibration parameters of the one or more cameras, wherein PSV slices, corresponding to one reference camera, are located at successive depth planes in a coordinate system of said one reference camera; and
    using this displacement map to generate at least one of a next and a previous slice of the plane sweep volume.

2. The method of claim 1, wherein said corresponding displacement map for the next slice is different.

3. The method of claim 1, wherein said corresponding displacement map for the previous slice is different.

4. The method of claim 1, wherein a displacement component is provided for each slice of the PSV and said displacement component is appended to each slice that captures the displacement from the current slice to the next one.

5. The method claim 4, wherein said displacement component occurs after a transmission of an encoded light field data relating to content has been generated and received.

6. The method of claim 1, wherein said images are captured by a light field camera.

7. The method of claim 1, wherein generating said PSV slices further comprises:
    providing depth information of each of the selected views at a plurality of depths; matching pixels of the provided depth of the selected views; and
    determining a depth for a requested pixel of the requested view and a color for each pixel of the selected view at the determined depth.

8. A non-transitory computer-readable medium storing computer-executable instructions executable to perform the method of claim 1.

9. An apparatus, comprising:
    at least one processor configured to:
        access a plurality of images captured one or more cameras, wherein said images represent a plurality of views corresponding to a same scene;
        generate, a plurality of plane sweep volume slices (PSV) from said images and computing for each slice a displacement map from calibration parameters of the one or more cameras, wherein PSV slices, corresponding to one reference camera, are located at successive depth planes in a coordinate system of said on reference camera; and
        generate, from a given slice, a corresponding displacement map for at least one of a next and a previous slice of the plane sweep volume.

10. The apparatus of claim 9, wherein said corresponding displacement map for the next slice is different.

11. The apparatus of claim 9, wherein said corresponding displacement map for the previous slice is different.

12. The apparatus of claim 9, wherein a displacement component is provided for each slice of the PSV and said displacement component is appended to each slice that captures the displacement from the current slice to the next one.

13. The apparatus of claim 12, wherein said displacement component occurs after a transmission of an encoded light field data relating to content has been generated and received.

14. The apparatus of claim 9, wherein said images are captured by a light field camera.

15. The apparatus of claim 9, wherein generating said PSV slices further comprises:
    providing depth information of each of the selected views at a plurality of depths; matching pixels of the provided depth of the selected views; and
    determining a depth for a requested pixel of the requested view and a color for each pixel of the selected view at the determined depth.

16. A method comprising:
    determining camera calibration parameters associated with a first plane sweep volume (PSV);
    obtaining a slice of the PSV and its associated displacement map based on the determined camera calibration parameters; and
    generating at least a previous or next PSV slice based on said first PSV slice and said camera calibration parameters.

* * * * *